United States Patent [19]

Kazami

[11] Patent Number: 5,521,666
[45] Date of Patent: May 28, 1996

[54] PERFORATION DETECTOR OF A CAMERA

[75] Inventor: Kazuyuki Kazami, Tokyo, Japan

[73] Assignee: Nikon Corporation, Tokyo, Japan

[21] Appl. No.: 480,384

[22] Filed: Jun. 7, 1995

Related U.S. Application Data

[63] Continuation of Ser. No. 270,317, Jul. 5, 1994, abandoned, which is a continuation of Ser. No. 805,959, Dec. 12, 1991, abandoned.

[30] Foreign Application Priority Data

Dec. 20, 1990 [JP] Japan ................. 2-412473

[51] Int. Cl.⁶ ............................. G03B 1/18
[52] U.S. Cl. ......................... 354/170; 354/217
[58] Field of Search .................. 354/170, 171, 354/173.1, 173.11, 217, 218, 431, 480

[56] References Cited

U.S. PATENT DOCUMENTS

| | | | |
|---|---|---|---|
| 4,131,350 | 12/1978 | Uchiyama et al. | 354/431 |
| 4,431,292 | 2/1984 | Takahashi | 354/173.11 |
| 4,540,261 | 9/1985 | Matsumoto et al. | 354/173.11 |
| 4,685,786 | 8/1987 | Iida et al. | 354/480 X |
| 4,954,859 | 9/1990 | Kitazawa | 354/173.11 |
| 4,972,214 | 11/1990 | Shibayama et al. | 354/173.1 |
| 4,996,549 | 2/1991 | Yamaguchi | 354/173.11 |
| 5,184,174 | 2/1993 | Bell | 354/480 |

*Primary Examiner*—David M. Gray
*Attorney, Agent, or Firm*—Shapiro and Shapiro

[57] ABSTRACT

A perforation detector of a camera comprises a light emitting unit for emitting light to a film, a photo-sensor for sensing reflected light from the film to produce a signal representing a sensed light intensity, the light intensity of the reflected light varying with presence or absence of a perforation at a reflection area of the film, a detection unit for comparing the signal from the photo-sensor with a predetermined value to detect a perforation of the film, and a control unit for controlling the light intensity of the light emitting unit in accordance with the signal from the photo-sensor.

40 Claims, 5 Drawing Sheets

PERFORATION DETECTOR OF A CAMERA

This is a continuation of application Ser. No. 08/270,317 filed Jul. 5, 1994, which is a continuation of application Ser. No. 07/805,959 filed Dec. 12, 1991, both abandoned.

BACKGROUND OF THE INVENTION

1. Field of the Invention

The present invention relates to a perforation detector of a camera for detecting a perforation of a film to control a feed amount of the film.

2. Related Background Art

When a film is to be fed by a predetermined amount such as in initial film feed or normal film feed, the film can be exactly positioned by detecting when a perforation formed in the film reaches a predetermined position and stopping the film feed at that moment.

A photo-reflector has been known as a perforation detector for this purpose. The photo-reflector comprises a light projection unit (for example, a light emitting diode) which projects a light to the film and a photo-sensor (for example, a photo-diode) which senses reflected light from the film, and detects the perforation from an output of the photo-sensor. Namely, when the perforation is not positioned at an area to which the light from the light projection unit is projected, the reflected light intensity from the film is high and the photo-sensor senses a higher light intensity, and when the perforation is positioned at the area to which the light is projected, the reflected light intensity from the film is low and the light intensity sensed by the photo-sensor is low. Accordingly, whether the perforation is at the predetermined position or not can be detected from the output of the photo-sensor.

However, the reflection index of the film varies from maker to maker or from sensitivity to sensitivity. Since the prior art photo-reflector has a fixed light intensity of the light projection unit, the output of the photo-sensor of the photo-reflector varies with the reflection index. This causes the following problem.

Figure 6:
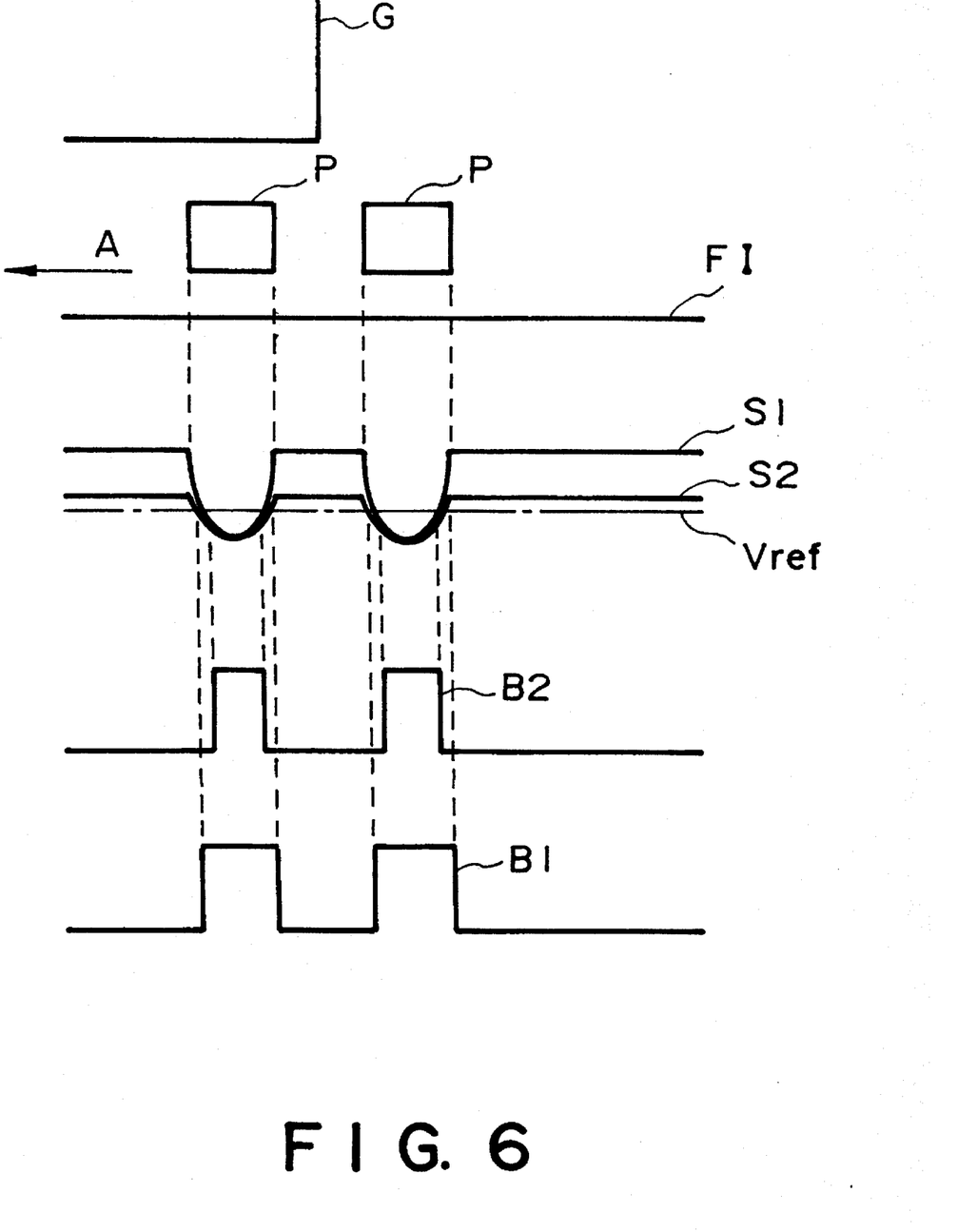
FIG. 6 shows an output of a photo-sensor for various areas of a film.

FIG. 6 shows an output waveform of the photo-sensor to areas of the film when the light intensity of the light projection unit is constant, and a pulse signal waveform derived by reshaping the output. FI denotes a film, G denotes a photographing screen and P denotes a perforation. S1 denotes a theoretical photo-sensor output when the reflection index of the film is sufficiently high, and S2 denotes a photo-sensor output when the reflection index of the film FI is low. As shown, S2 is lower than S1. Vref denotes a reference voltage to determine the presence or absense of the detection of the perforation. The perforation is detected when the photo-sensor output S1 or S2 is no higher than Vref. B1 and B2 denote pulse signals derived by reshaping the outputs S1 and S2, respectively. As seen from the figure, when the film is fed in the direction A, the pulse B2 is produced later than the pulse B1 for the same perforation. This means that the detection of the perforation is delayed when the reflection index of the film is low compared to that when the reflection index is high. In such a case, the film FI cannot be exactly positioned.

This problem may be solved by setting the light intensity of the photo-diode to a fairly high level, but if the light intensity is merely increased, it wastes battery power where the reflection index of the film is sufficiently high and the light intensity may be low. Accordingly, this in vain shorten a battery life.

SUMMARY OF THE INVENTION

It is an object of the present invention to provide a perforation detector of a camera which can exactly detect a perforation without shortening battery life.

The present invention is applicable to a perforation detector of a camera which comprises detection means including light projection means for projecting light to a film and photo-sensing means for sensing reflected light from the film, and which detects the perforation from an output of the photosensing means.

The perforation detector of the present invention includes control means which evaluates the output of the photo-sensing means and controls light intensity of the light projection means in accordance with the evaluation.

The perforation detector of the present invention further includes input means for inputting information relating to a reflection index of the film and control means for controlling the light intensity of the light projection means in accordance with the input information.

The control means evaluates the output of the photo-sensing means and controls the light intensity of the light projection means in accordance with the evaluation. Thus, the light intensity of the light projection means is controlled by the reflection index of the film so that the perforation can be exactly detected without vainly consuming battery power.

The control means further controls the light intensity of the light projection means in accordance with the input information (information relating to the reflection index of the film) of the input means. Thus, the same effect as that described above is attained.

DETAILED DESCRIPTION OF THE PREFERRED EMBODIMENTS

Embodiment 1

An embodiment of the present invention is now explained with reference to FIG. 1.

Figure 1:
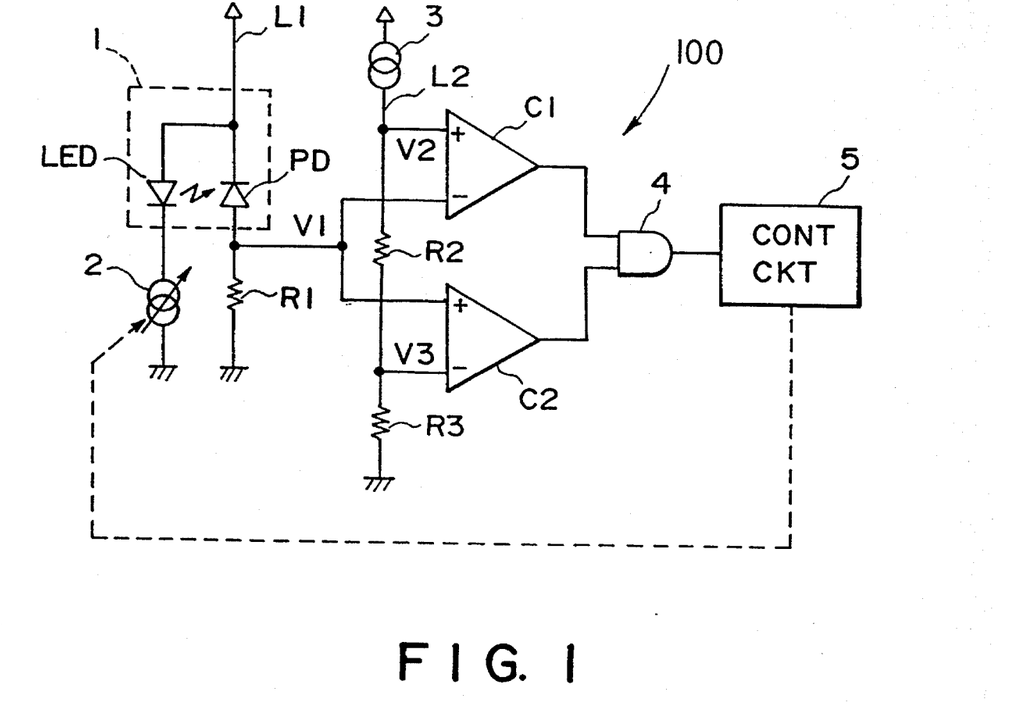
FIG. 1 shows a configuration of a perforation detector in accordance with a first embodiemnt of the present invention.

FIG. 1 shows a block diagram of a configuration of a perforation detector of a camera in accordance with the present invention. Numeral 1 denotes a photo-reflector for detecting a perforation of a film FI (FIG. 6) and it comprises a light emitting diode LED which functions as a light emitting element and a photo-diode PD which functions as a photo-sensing element. The light emitting diode LED projects light to perforation of the film FI loaded to the camera, and the light is reflected by the film FI and sensed by the photo-diode PD. When the perforation P is not positioned at the area to which the light from the light emitting diode LED is projected, the light intensity reflected by the film FI is high and the light intensity sensed by the photo-diode PD is high. On the other hand, when the perforation P is positioned at the area to which the light is projected, the light intensity of the reflected light from the film FI is low and the light intensity sensed by the photo-diode P is low.

The light intensity of the light emitting diode LED is controlled by a variable current source 2. A current representing the light intensity sensed by the photo-diode PD flows through a line L1 to which the photo-diode PD is connected, and a voltage V1 is developed between a resistor R1 and the photo-diode PD. This voltage V1 is applied to an inverting input terminal of a comparator C1 and a non-inverting input terminal of a comparator C2. Numeral 3 denotes a current source which supplies a constant current to a line L2. Thus, a voltage V2 is developed between a resistor R2 and the current source 3, and a voltage V3 is developed by the resistors R2 and R3. The voltage V2 is applied to a non-inverting input terminal of the comparator C1, and the voltage V3 is applied to an inverting input terminal of the comparator C2. Outputs of the comparators C1 and C2 are applied to an AND gate 4 and an output of the AND gate 4 is applied to a control circuit 5.

In the above configuration, the output of the AND gate 4 is high only when the output voltage V1 of the photo-diode PD is in the range of V2–V3, and low when the output voltage V1 is beyond the range V2–V3. The fact that the output voltage V1 is in the range V2–V3 means that the voltage V1 is large enough to exactly detect the perforation P, that is, it is the theoretical output S1 shown in FIG. 6.

The control circuit 5 controls the variable current source 2 in accordance with the output of the AND gate 4 to control the light intensity of the light emitting diode LED so that the output voltage V1 of the photo-diode PD is always maintained in the voltage range V2–V3. More particularly, when the voltage V1 is to be increased, the light intensity of the light emitting diode LED is increased, and when the voltage V1 is to be decreased, the light intensity of the light emitting diode LED is decreased. Thus, when the reflection index of the film FI is low, the light intensity of the light emitting diode LED is increased accordingly, and when the reflection index of the film is high, the light intensity of the light emitting diode LED is decreased so that the perforation P can be exactly detected without vainly consuming battery power.

In the present embodiment, the light emitting diode LED functions as the light projection means, the photo-diode PD functions as the photo-sensing means, the photo-reflector 1 functions as the detection means 1 and the comparators C1 and C2, the AND gate 4 and the control circuit 5 function as the control means 100.

In the present embodiment, the outputs of the comparators C1 and C2 are applied to the AND gate 4 and the output of the AND gate 4 is applied to the control circuit 5. Alternatively, the outputs of the comparators C1 and C2 may be applied to the control circuit 5 so that the control circuit 5 may determine whether the light intensity of the light emitting diode LED is to be increased or decreased.

The output voltage V1 of the photo-diode PD changes to a low level each time the perforation is detected. Thus, the light intensity of the light emitting diode LED may be controlled when the output voltage V1 changes to a high level.

Embodiment 2

A second embodiment of the present invention is explained with reference to FIGS. 2 and 3.

Figure 2:
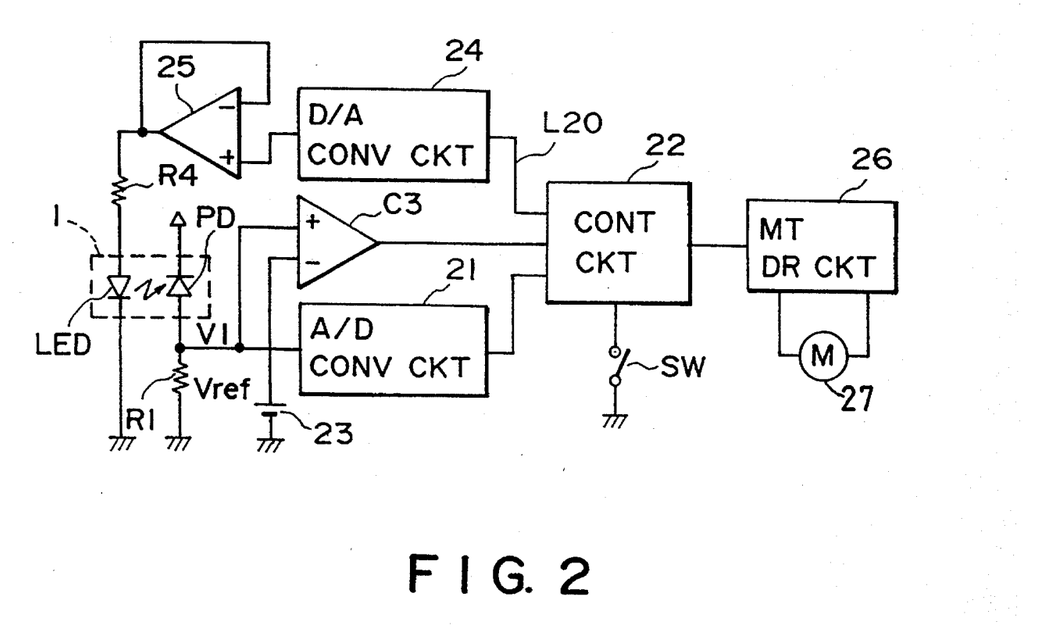
FIG. 2 shows a configuration of a perforation detector in accordance with a second embodiment of the present invention.

FIG. 2 shows a perforation detector of a camera in accordance with the second embodiment. The like elements to those of FIG. 1 are designated by the like numerals.

In FIG. 2, the voltage V1 developed by the output current of the photo-diode PD of the photo-reflector 1 is applied to a non-inverting input terminal of a comparator C3 and it is also converted to a digital value by an A/D converter 21 and an output of the A/D converter 21 is applied to a control circuit 22. A reference voltage Vref (see FIG. 6) of a reference voltage source 23 is applied to an inverting input terminal of the comparator C3 and an output of the comparator C3 is applied to the control circuit 22. The control circuit 22 determines whether the perforation is detected or not in accordance with the output of the comparator C3.

A current setting digital signal produced on a line L20 by the control circuit 22 is D/A converted by a D/A converter 24 and it is applied to the light emitting diode LED through a voltage follower 25 and a resistor R4. Thus, the light emitting diode LED emits light of a predetermined light intensity. A motor drive circuit 26 of a film feed motor 27 is connected to the control circuit 22. It feeds the film by the film feed motor 27 in response to a command from the control circuit 22. A rear cover switch SW which is turned on when a rear cover of the camera is closed is also connected to the control circuit 22.

A control process in an initial film feed by the control circuit 22 is explained with reference to a flow chart of FIG. 3.

Figure 3:
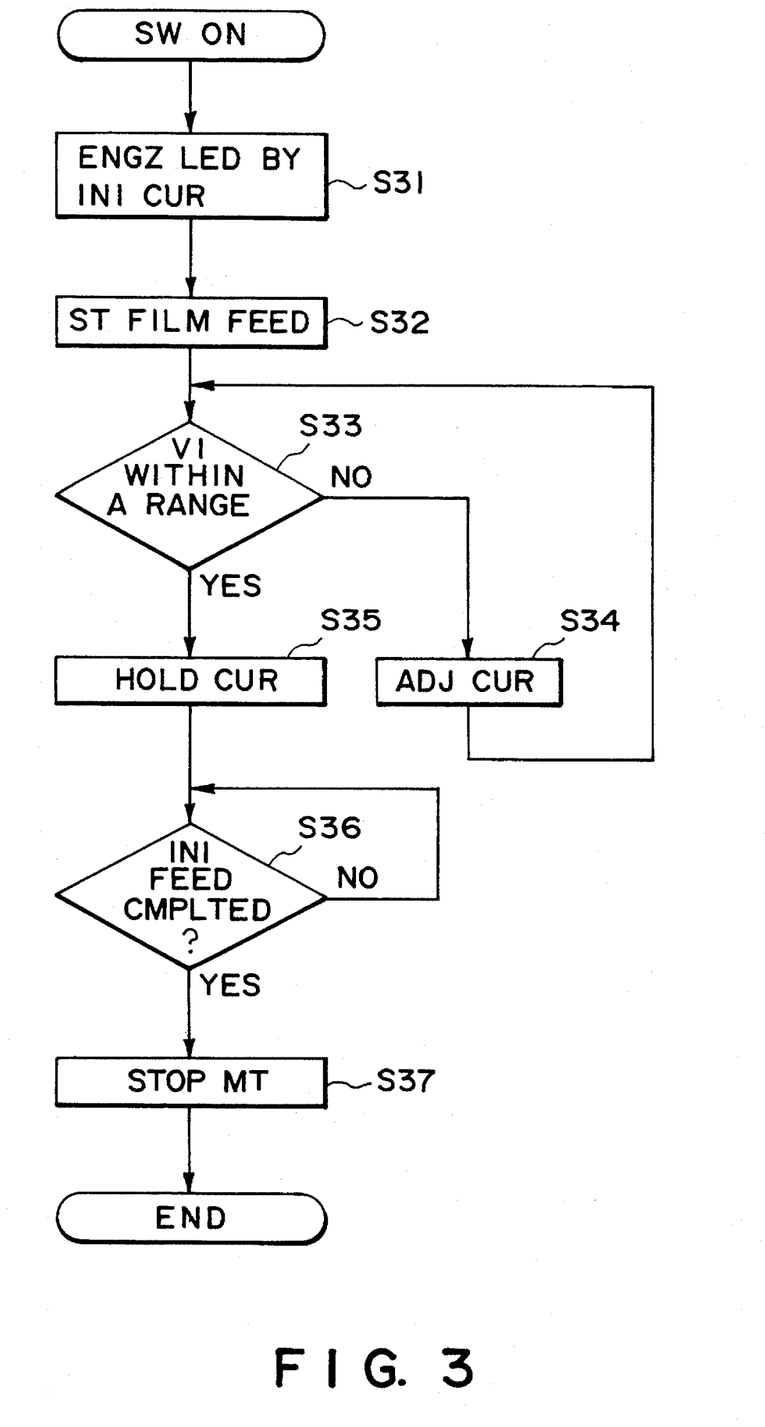
FIG. 3 shows a process flow chart.

When a film is loaded to the camera and the rear cover is closed, the rear cover switch SW is turned on and a program of FIG. 3 is started. In a step S31, a predetermined initial value is applied to the line L20. The D/A converter 24 D/A converts it and the output thereof is applied to the light emitting diode LED through the voltage follower 25 and the resistor R4 so that the light emitting diode LED emits the light of the predetermined light intensity.

In a step S32, the feed of the film FI by the motor 27 through the motor drive circuit 26 is started. In a step S33, the output voltage V1 of the photodiode PD is read through the A/D converter 21 to determine whether it is within the predetermined range (for example, the range V2–V3). If the decision in the step S33 is NO, the current is adjusted by the output to the line L20 in a step S34 and the process returns to the step S33. Namely, if the voltage V1 is above the predetermined range, the output current is decreased, and if it is below the predetermined range, the output current is increased.

On the other hand, if the decision in the step S33 is YES, the output current is held as it is in a step S35 and the process proceeds to a step S36. In the step S36, the end of the initial film feed (feeding by a predetermined number of frames) is monitored. Namely, the detection of a predetermined perforation is monitored by the output of the comparator C3, and when it is detected, the end of initial feed is determined and the process proceeds to a step S37 to stop the motor 27 and terminate the process.

In the present embodiment, when the reflection index of the film FI is low, the light intensity of the light emitting diode LED is increased accordingly, and when the reflection index of the film is high, the light intensity of the light emitting diode LED is decreased. Thus, the perforation P can be exactly detected without vainly consuming battery power, as it is in the previous embodiment.

Embodiment 3

A third embodiment of the present invention is explained with reference to FIGS. 4 and 5.

Figure 4:
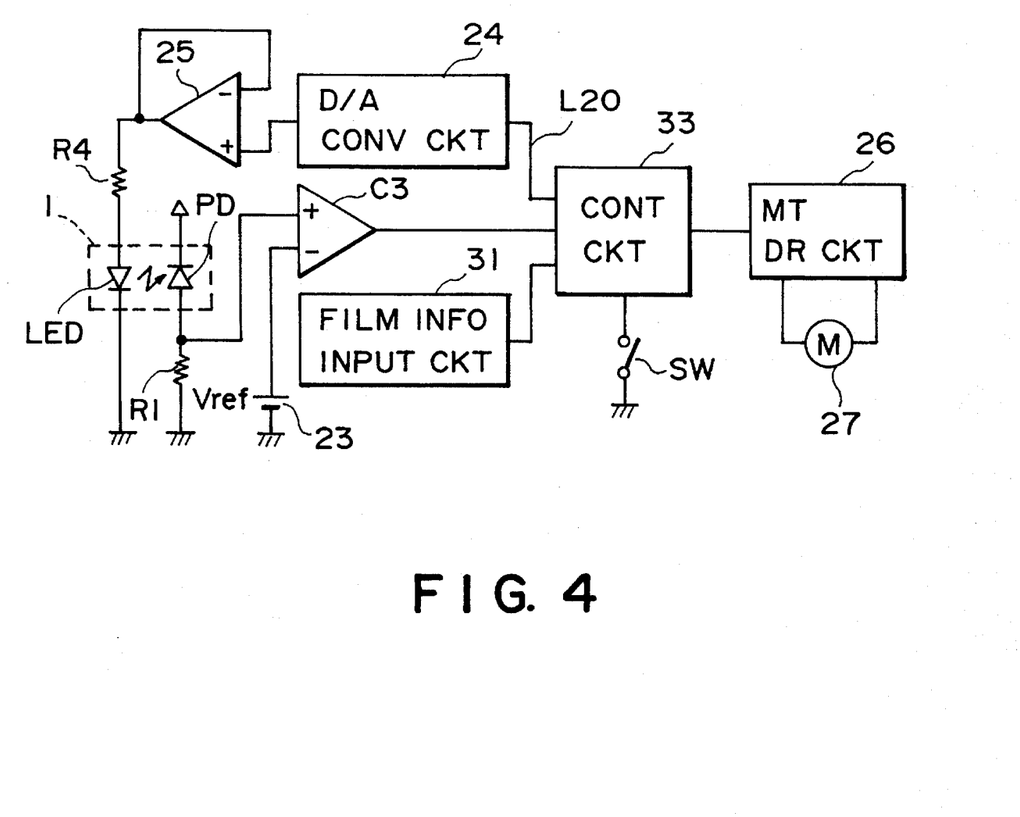
FIG. 4 shows a configuration of a perforation detector in accordance with a third embodiment of the present invention.

FIG. 4 shows a perforation detector of a camera in accordance with the present embodiment. The like elements to those in FIG. 2 are designated by the like numerals. Numeral 31 denotes a film information input circuit such as a circuit for entering film sensitivity information on a cartridge. The film sensitivity information is supplied to a control circuit 33. The film information may be extracted by other means.

Figure 5:
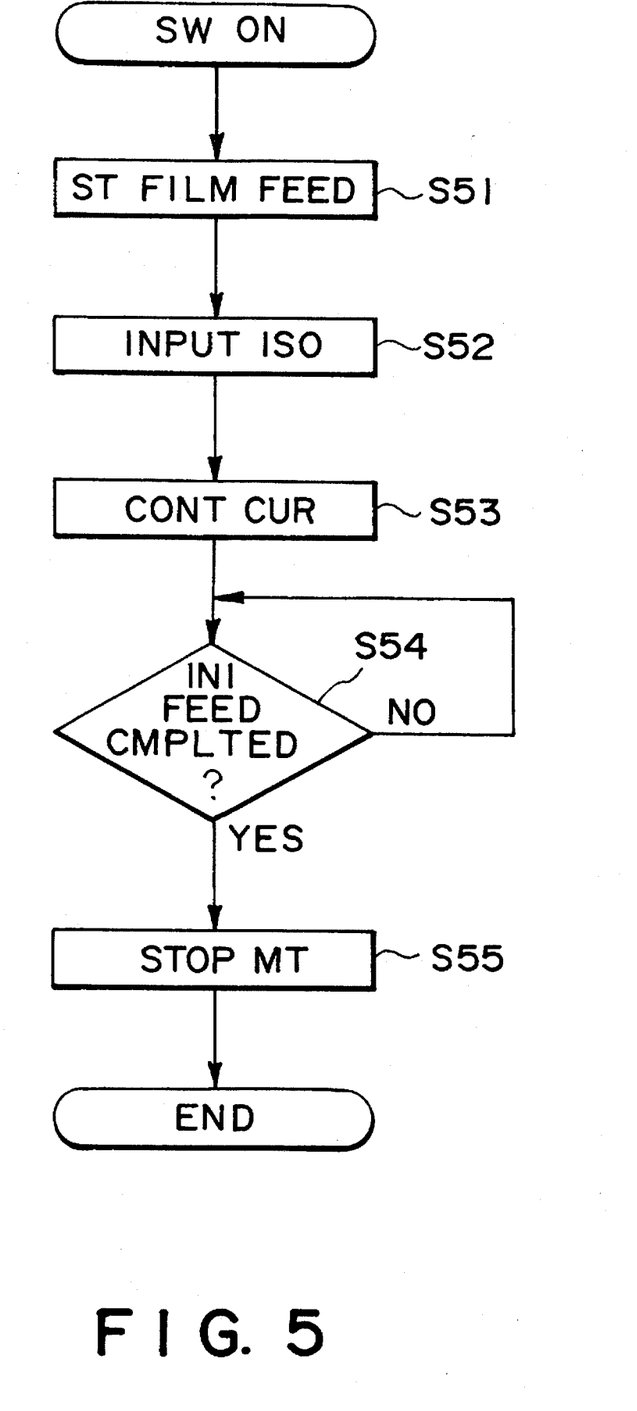
FIG. 5 shows a process flow chart.

FIG. 5 shows a control process of the control circuit 33 in the present embodiment. When the film is loaded and the rear cover is closed, the rear cover switch SW is turned on and the program is started. In a step S51, the film feed is started. In a step S52, the ISO sensitivity information of the film is entered by the film information input circuit 31. The timing of entering the ISO sensitivity information is not limited to this particular time point. Since the reflection index of the film varies with the ISO sensitivity, the ISO sensitivity corresponds to the information relating to the reflection index of the film. In a step S53, a current determined by the input ISO sensitivity is supplied to the line L20. The current is supplied to the light emitting diode LED through the D/A converter 24, the voltage follower 25 and the resistor R4 so that the light emitting diode LED emits light.

When the end of initial feed is detected in a step S54, the motor 27 is stopped in a step S55.

In the present embodiment, the ISO sensitivity information of the film (which relates to the reflection index of the film) is entered to control the light intensity of the light emitting diode LED. Accordingly, the light intensity of the light emitting diode is controlled by the reflection index of the film FI and the perforation P can be exactly detected without vainly consuming the power battery.

The method of entering the ISO sensitivity is not limited to the above method and it may be manually entered by a photographer. The information relating to the reflection index of the film is not limited to the ISO sensitivity but information relating to a type of film (for example, negative or reversal) may be used.

In accordance with the present invention, the output of the photo-sensing means is evaluated and the light intensity of the light projection means is controlled in accordance with the evaluation. Accordingly, the light intensity of the light projection means can be controlled in accordance with the reflection index of the film and a perforation can be detected exactly without vainly consuming battery power.

Further, in accordance with the present invention, information relating to the reflection index of the film is entered and the light intensity of the light projection means is controlled in accordance with the input information. Accordingly, the same effect as that described above is attained.

What is claimed is:

1. A perforation detector comprising:

a light projecting portion for projecting light to a film;

a light receiving portion provided in the neighborhood of said light projecting portion and at a position where the projected light can be received, for receiving reflected light from the film when the light is projected to the film, and for producing a signal corresponding to an amount of the received light, said amount varying with presence or absence of a perforation at a reflection area of the film; and a controller electrically connected between said light projecting portion and said light receiving portion, for comparing the signal produced by said light receiving portion with a predetermined reference to determine whether or not a perforation exists on the film, and for controlling an amount of the light projected from the light projecting portion in accordance with a level of the signal produced by said light receiving portion.

2. A perforation detector according to claim 1 wherein said controller determines whether or not the signal level is within a predetermined range, prior to detection of a specified perforation of the film, and controls the amount of light projected from said light projecting portion when the signal level is out of the range so that it becomes within the range.

3. A perforation detector according to claim 2 wherein said controller reduces the amount of the projected light if the signal level is over the predetermined range and increases the amount of the projected light if the signal level is under the predetermined range.

4. A perforation detector according to claim 1 wherein said controller includes a variable power supply for supplying to said light projecting portion a current variable within a predetermined range in accordance with the signal level.

5. A perforation detector according to claim 1 wherein the predetermined reference is a voltage value.

6. A perforation detector according to claim 1 wherein said light receiving portion receives light reflected from the reflection area having no perforation, and said controller controls the amount of the light projected on the basis of the signal level produced by said light receiving portion in accordance with an amount of the last-mentioned received light.

7. A perforation detector according to claim 1, wherein said controller includes a comparator for inputting the signal produced by said light receiving portion, and a digital-to-analog converter for adjusting the amount of projected light from said light projecting portion.

8. A perforation detector according to claim 1, wherein said controller includes an analog-to-digital converter for inputting the signal produced by said light receiving portion, and a digital-to-analog converter for adjusting the amount of projected light from said light projecting portion.

9. A perforation detector of a device in which a film is fed by a motor, comprising:

a light projecting portion for projecting light to a film;

a light receiving portion provided in the neighborhood of said light projecting portion and at a position where the projected light can be received, for receiving reflected light from the film when the light is projected to the film and producing a signal corresponding to an amount of the received light, said amount varying with presence or absence of a perforation at a reflection area of the film; and a controller electrically connected between said light projecting portion and said light receiving portion, for comparing the signal produced by said light receiving portion with a predetermined reference to determine whether or not a perforation exists on the film, and for controlling an amount of the light projected from the light projecting portion in accordance with a level of the signal produced by said light receiving portion;

wherein said controller determines the existence of a perforation of the film on the basis of the controlled amount of the light projected from the light projecting portion and outputs a stop signal for stopping said motor when a specified perforation is determined to exist.

10. A perforation detector according to claim 9 wherein the film is fed after being loaded.

11. A perforation detector according to claim 9 wherein said controller includes a variable power supply for supplying to said light projecting portion a current variable within a predetermined range in accordance with the signal level.

12. A perforation detector according to claim 9 wherein the predetermined reference is a voltage value.

13. A perforation detector according to claim 9 wherein said reference is a predetermined range, and said controller reduces the amount of the projected light if the signal level is over the predetermined range and increases the amount of the projected light if the signal level is under the predetermined range.

14. A perforation detector according to claim 9, wherein said controller determines the amount of projected light while the film is fed by the motor.

15. A perforation detector according to claim 9, wherein said controller includes a comparator for inputting the signal produced by said light receiving portion, and a digital-to-analog converter for adjusting the amount of projected light from said light projecting portion.

16. A perforation detector according to claim 9, wherein said controller includes an analog-to-digital converter for inputting the signal produced by said light receiving portion, and a digital-to-analog converter for adjusting the amount of projected light from said light projecting portion.

17. A perforation detector comprising:

a light projecting portion for projecting light to a film;

an information input portion for inputting information relating to a reflectance of the film;

a light receiving portion provided in the neighborhood of said light projecting portion and at a position where the projected light can be received, for receiving reflected light from the film when the light is projected to the film and producing a signal corresponding to an amount of the received light, said amount varying with presence or absence of a perforation at a reflection area of the film and the reflectance thereof; and a controller electrically connected among said light projecting portion, said information input portion and said light receiving portion, for controlling an amount of the light projected from the light projecting portion based on said signal and the information relating to the reflectance.

18. A perforation detector according to claim 17 wherein the information relating to the reflectance is film sensitivity information.

19. A perforation detector according to claim 17 wherein said controller includes a variable power supply for supplying to said light projecting portion a current variable within a predetermined range in accordance with the information relating to the reflectance.

20. A perforation detector according to claim 17, wherein said controller includes a comparator for inputting the signal produced by said light receiving portion, and a digital-to-analog converter for adjusting the amount of projected light from said light projecting portion.

21. A perforation detector according to claim 17, wherein said controller includes an analog-to-digital converter for inputting the signal produced by said light receiving portion, and a digital-to-analog converter for adjusting the amount of projected light from said light projecting portion.

22. A perforation detector of a device in which a film is fed by a motor so that film frames are set behind an aperture individually, comprising:

a light projecting portion for projecting light to a film;

a light receiving portion provided in the neighborhood of said light projecting portion and at a position where the projected light can be received, for receiving reflected light from the film when the light is projected to the film and producing a signal corresponding to an amount of the received light, said amount varying with presence or absence of a perforation at a reflection area of the film; and a controller electrically connected between said light projecting portion and said light receiving portion, for comparing the signal produced by said light receiving portion with a predetermined reference to determine whether or not a perforation exists on the film, and for controlling an amount of the light projected from the light projecting portion in accordance with a level of the signal produced by said light receiving portion, said controller judging whether or not the signal level produced by the light receiving portion is within a predetermined range, during the feed of the film by said motor and prior to setting of a first film frame behind said aperture, and controlling an amount of the light projected from the light projecting portion when the signal level is out of the range so that it becomes within the range.

23. A perforation detector according to claim 22 wherein the amount of the projected light is controlled before the first frame of the film is set behind the aperture.

24. A perforation detector according to claim 22 wherein the amount of the projected light is controlled before an unexposed frame is set behind the aperture.

25. A perforation detector according to claim 22, wherein said controller includes a comparator for inputting the signal produced by said light receiving portion, and a digital-to-analog converter for adjusting the amount of projected light from said light projecting portion.

26. A perforation detector according to claim 22, wherein said controller includes an analog-to-digital converter for inputting the signal produced by said light receiving portion, and a digital-to-analog converter for adjusting the amount of projected light from said light projecting portion.

27. A method of detecting a perforation comprising:

projecting light to a film;

receiving reflected light from the film when the light is projected thereto and producing a signal corresponding to an amount of the received light, said amount varying with presence or absence of a perforation at a reflection area of the film;

controlling an amount of the light projected, in accordance with a level of the signal; and comparing the signal with a predetermined reference to determine whether or not a perforation exists on the film.

28. A method of detecting a perforation in a device in which a film is fed by a motor, comprising:

projecting light to the film;

receiving reflected light from the film when the light is projected thereto and producing a signal corresponding to an amount of the received light, said amount varying with presence or absence of a perforation at a reflection area of the film;

controlling an amount of the light projected, in accordance with a level of the signal;

comparing the signal with a predetermined reference to determine whether or not a perforation exists on the film; and outputting a stop signal for stopping said motor when a specified perforation is determined to exist.

29. A method of detecting a perforation comprising:

projecting light to a film;

inputting information relating to reflectance of the film;

receiving reflected light from the film when the light is projected thereto and producing a signal corresponding to an amount of the received light, said amount varying with presence or absence of a perforation at a reflection area of the film and the reflectance thereof; and controlling an amount of the light projected, based on said signal and the information relating to the reflectance.

30. A method of detecting a perforation in a device in which a film is fed by a motor so that film frames are set behind an aperture individually, comprising the steps of:

projecting light to the film;

receiving reflected light from the film when the light is projected to the film and producing a signal corresponding to an amount of the received light, said amount varying with presence or absence of a perforation at a reflection area of the film;

judging whether or not the level of the signal is within a predetermined range, during the feed of the film by said motor and prior to setting of a first film frame behind said aperture;

controlling an amount of the projected light when the signal level is out of the predetermined range so that it becomes within the range; and comparing the signal with a predetermined reference to determine whether or not a perforation exists on the film.

31. A perforation detector of a device in which a film is fed by a motor so that film frames are aligned with an aperture individually, comprising:

a light projecting portion for projecting light to a film;

a light receiving portion provided in the neighborhood of said light projecting portion and at a position where the projected light can be received, for receiving reflected light from the film when the light is projected to the film and producing a signal corresponding to an amount of the received light, said amount varying with presence or absence of a perforation at a reflection area of the film; and a controller electrically connected between said light projecting portion and said light receiving portion, for controlling a relative difference between the signal produced by the light receiving portion and a predetermined reference based on the level of the signal produced by said light receiving portion, so as to become within a predetermined range, during the feed of the film by said motor and prior to completion of an alignment of a first film frame with said aperture.

32. A perforation detector according to claim 31, wherein said controller judges whether or not a perforation exists on the film, by comparing the signal produced by said light receiving portion with the predetermined reference, and said controller completes the control of the relative difference within the predetermined range, before a predetermined perforation on the film is detected.

33. A perforation detector according to claim 31, wherein said device is a camera.

34. A perforation detector according to claim 31, wherein said controller includes a comparator for inputting the signal produced by said light receiving portion and a D/A converter for adjusting the amount of projected light from said light projecting portion.

35. A perforation detector according to claim 31, wherein said controller includes an A/D converter for inputting the signal produced by said light receiving portion and a D/A converter for adjusting the amount of projected light from said light projecting portion.

36. A perforation detector comprising:

a light projecting portion for projecting light to a film;

an information input portion for inputting information relating to reflectance of the film;

a light receiving portion provided in the neighborhood of said light projecting portion and at a position where the projected light can be received, for receiving reflected light from the film when the light is projected to the film and producing a signal corresponding to an amount of the received light, said amount varying with presence or absence of a perforation at a reflection area of the film and with the reflectance thereof; and a controller electrically connected among said light projecting portion, said information input portion and said light receiving portion, for controlling a relative difference between the signal produced by the light receiving portion and a predetermined reference based on the level of the signal produced by said light receiving portion and the information relating to reflectance, so as to become within a predetermined range.

37. A perforation detector according to claim 36, wherein said controller judges whether or not a perforation exists on the film, by comparing the signal produced by said light receiving portion with the predetermined reference, and said controller completes the control of the relative difference within the predetermined range, before a predetermined perforation on the film is detected.

38. A perforation detector according to claim 36, wherein said perforation detector is provided in a camera.

39. A perforation detector according to claim 36, wherein said controller includes a comparator for inputting the signal produced by said light receiving portion and a D/A converter for adjusting the amount of projected light from said light projecting portion.

40. A perforation detector according to claim 36, wherein said controller includes an A/D converter for inputting the signal produced by said light receiving portion and a D/A converter for adjusting the amount of projected light from said light projecting portion.

* * * * *